Nov. 14, 1944.                J. MIHALYI ET AL                    2,362,577
                         FILM CARTRIDGE AND SPOOL THEREFOR
                              Filed May 23, 1942

JOSEPH MIHALYI
JOHN W. SCOTT
  INVENTORS
BY
       ATTORNEYS

Patented Nov. 14, 1944

2,362,577

UNITED STATES PATENT OFFICE 2,362,577

FILM CARTRIDGE AND SPOOL THEREFOR

Joseph Mihalyi and John W. Scott, Rochester, N. Y., assignors to Eastman Kodak Company, Rochester, N. Y., a corporation of New Jersey Application May 23, 1942, Serial No. 444,170

6 Claims. (Cl. 242—71)

This invention relates to photography and more particularly to a photographic film spool cartridge. One object of our invention is to provide a film cartridge in which a special means is provided for preventing light from entering between convolutions of film wound on a spool. Another object of our invention is to provide a film cartridge in which the expansion and contraction of the film does not affect the light seal between the film spool flanges and the convolutions of film wound thereon. Another object of our invention is to provide a film spool cartridge which is particularly adapted for use with convolutions of film, eliminating the backing paper normally used. Still another object of our invention is to provide a spool suitable for use in such a film cartridge. Still another object of our invention is to provide a film spool in which the flanges are so constructed that the peripheries of the flanges lie closer together than the remainder of the flanges and to provide a film spool core of such a nature that film wider than the distance between the peripheries of the flanges may be readily drawn onto and unreeled from our improved spool.

In the past, many expedients have been used to reduce or prevent light from entering convolutions of film wound on film spools. It has been more or less common practice to provide film cartridges by winding a film spool with convolutions of backing paper and film, the backing paper protecting the film against light as the convolutions are wound between two flanges. In some instances film cartridges have been provided with backing paper slightly wider than the distance between the spool flanges with the edges roughened or thinned so as to make intimate contact with film spool flanges to prevent light leakage.

One of the chief difficulties has been that even if a film is accurately cut to a known width the film expands and contracts largely in accordance with the moisture content of the film so that even though the film itself may closely fit film spool flanges when manufactured and spooled, the film may later shrink, thus permitting light to enter between the flanges and the edges of the film. This may be particularly noticeable where backing paper is eliminated and the film is provided with a backing to prevent light from passing therethrough.

Our improved film cartridge is designed to completely overcome or largely eliminate light leaks which have occurred with previous types of film cartridges.

Coming to the drawing wherein like reference characters denote like parts throughout:

Our invention comprises broadly providing a film cartridge with an improved form of film spool in which either rigid or flexible flanges may be permanently attached to a film core, as for instance by spot welding, the film core being so constructed that the distance between the flanges may vary in accordance with the width of the film or in accordance with the requirements for spooling. In other words, the distance between the film spool flanges may automatically accommodate themselves to the particular width of the film band wound on the film spool and if the film, through absorption of moisture or otherwise may change in width, the distance between the flanges may vary a corresponding distance to automatically take care of this distance.

If our improved film spool is used in a camera which requires the film to be propelled from and rewound to a single spool, as in the copending application Serial No. 430,789, filed February 13, 1942, now Patent No. 2,336,278 dated December 7, 1943, for Film winding apparatus, in the name of Joseph Mihalyi, the film in passing to or from the spool may require that the flanges separate somewhat during the winding and rewinding operations. Our improved spool automatically takes care of such winding operations.

More specifically our improved film cartridge may consist of a film 1 which may be attached by means of pasters 2 to a film spool core 3 to which there are affixed the usual flanges 4.

Figure 3:
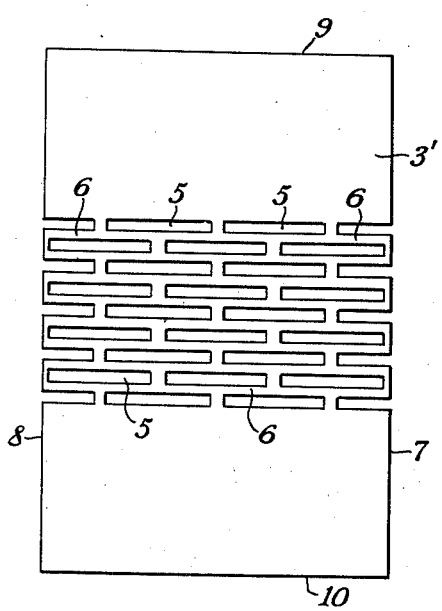
Fig. 3 is a plan view of a blank from which the film core of Fig. 1 is rolled up showing one grid pattern which may be used in accordance with our invention.

The film spool core 3 is of a special construction which can be very readily made and which is shown in unrolled form in Fig. 3. From this figure it will be noticed that the blank of which the film spool hub 3 is formed is provided with a series of perforations 5, these perforations being arranged in a grid-like pattern leaving a series of thin metal bands 6 connecting the blank so that it will remain one integral piece of metal. The blank is preferably punched out of slightly springy steel so that the material is resilient and so that, if pressure is applied to the ends of the film spool core 3 as by pulling in opposite directions upon the flanges 4, the length of the hub 3 may be increased since the thin metal bands 6 of the grid-like pattern will permit such expansion.

However, if the pressure is released the thin metal bands 6 will restore the film spool core to a normal position from which it may also be compressed by pressing the flanges 4 together. Thus, the length of the film core 3 is variable because of the spring construction above described.

With the blank shown in Fig. 3 the core can be rolled up by rolling the blank 3' into a cylindrical form. If desirable, the edges 7 and 8 may be fastened together as by spot welding, soldering or the like. We prefer to leave the edges 9 and 10 of the hub totally without perforations so that the flanges 4 may be firmly united to these edges in any suitable manner. We find, however, that spot welding as indicated at 11 is a desirable method of fastening the flanges 4 in place.

The flanges 4 may be of a known type in which the peripheries of the flanges are provided with formations 12 extending toward each other so that the peripheries of these flanges lie closer together than other portions thereof. Thus, when the film 1 is wound on the core 3, the film will preferably lie inside of the area designated as A between the formings 12 and the core 3. When in this position the spring core 3 will tend to draw the flanges together and into close engagement with the longitudinal edges 14 of the film so that a close and light-tight fit is thus obtained. With the film so wound the resiliency of the core will hold the flanges 4 tightly against the film edges 14. However, when the film is wound in a camera the flanges 4 may move away from each other as the film passes between the formings 12 on the flanges because the distance between the ends of the core 9 and 10 will be increased through the resilience of the grid portion of the core. The degree of resilience in the core can readily be obtained by selecting the metal—preferably steel—of such a thickness that a grid pattern can readily be punched in the material so as to leave the metal band 6 of the proper thickness to give the desired degree of spring. We have found that for a film spool taking film of approximately 2¼" in width a difference in separation between the flanges of around 1/16" is usually sufficient. This distance may be varied considerably with different widths or types of film.

Figure 5:
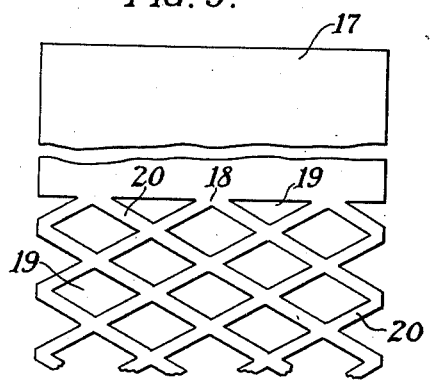
Fig. 5 is a portion of a second form of grid which may be used to construct still another form of our invention.

While we find that a grid pattern leaving thin metal strips 6 running substantially transversely of the axis of the film core is very desirable since it is easy to obtain the proper degree of resilience with such film spool cores, we nevertheless can use various other patterns, it only being necessary to provide a pattern in which thin resilient metal bands are left of such a thickness and width that the desired degree of resilience will occur in the core. Thus, in Fig. 5 we have shown a blank 17 which is provided with a grid pattern designated broadly as 18 formed by punching out areas 19 so as to leave thin metal bands 20 which may serve as spring arms as above described.

We would like to point out that the scale of the film spools shown in the drawing is somewhat exaggerated, particularly as to the thickness of the metal and the degree of embossing shown in the flanges 4, so that our invention may more readily be illustrated. Actually the film spool hubs can conveniently be made of metal around .015" thick and if the spool flanges 4 are to be of the rigid type metal of the same thickness may be used. However, if spring steel is to be used for the flanges this thickness can be reduced to say .008". These figures are given purely by way of example because it is a little difficult to visualize the spring core 3 and to realize how a delicate pressure can cause the core to expand or contract.

The flanges may be equipped with the usual type of spool supporting bearings, one flange for instance may be provided with a key slot 24 and the opposite flange may be provided with a round bearing 25, such bearings being familiar to those skilled in the art.

Figure 2:
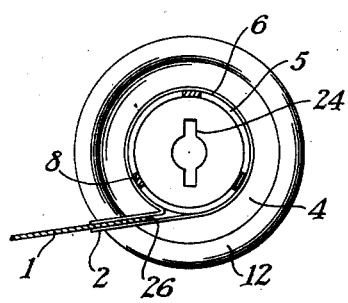
Fig. 2 is a section taken on line 2—2 of Fig. 1.
Figure 1:
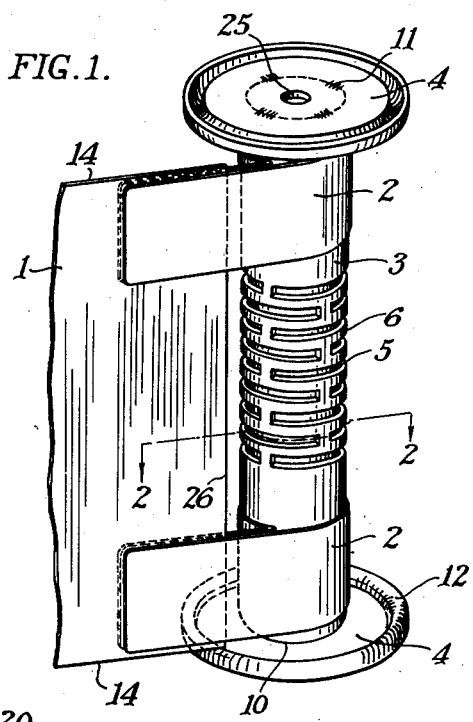
Fig. 1 is a perspective view of a portion of a film cartridge constructed in accordance with and embodying a preferred form of our invention.
Figure 4:
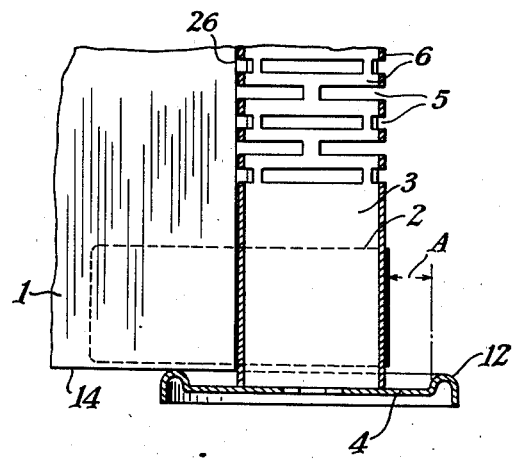
Fig. 4 is a fragmentary detail section showing a portion of a film and film spool constituting a slightly different embodiment of our invention.

In attaching the film 1 to the core 3, we propose to use pasters 2 as shown in Fig. 1, one paster being spaced on each side of the portion of the core 3 bearing the punched-out areas. In Fig. 1 the inner edge of the film 26 may be spaced a short distance from the core 3. However, if the film cartridge is to be used for unwinding and winding film as shown broadly in the above-referred to Mihalyi application, it is usually more convenient to have the inner end 26 of the film lie close to or in contact with the core 3 as indicated in Fig. 4. The same type of pasters 2 may be used if desired.

With the film cartridge including our improved spool, the liability of accidental exposure of the film to light is greatly minimized or may be entirely eliminated since the flanges 4 always tend to remain in close contact with the edges 14 of the film. This is due to the fact that the core 3 is so built that its normal position of rest will hold the flanges spaced the same distance as the width of the film or slightly less than the minimum width of the film. Thus, with most film cartridges the core 3 applies a slight inward pressure to the convolutions of film 1 wound between the flanges. This pressure is very slight and the film can be withdrawn from between the flanges by permitting the flanges to spring apart as the film passes over the embossings 12.

Our spool is economical to construct because it may be made of the usual three pieces of metal which are frequently employed in known types of film cartridges and because the core may be embodied in a single piece of metal which may be blanked out and rolled up with the same machinery now used to manufacture the solid core film spools except for the perforating dies used to provide the resilient grid pattern.

What we claim as new and desire to be secured by Letters Patent of the United States is:

1. In a film cartridge, the combination with a strip of film of known width, of a spool on which said film may be wound comprising a one-piece core, flanges attached to the core, inwardly turned peripheries on said flanges whereby the peripheries of the two flanges lie closer together than other portions of said flanges, means included in the film core for holding convolutions of film between the inwardly turned peripheries of the flanges, said means comprising a flexible portion formed integrally in the core and of a flexibility to permit the withdrawal of film from the convolutions carried by the core through separating the spool flanges due to flexing of the film spool core.

2. A spool for film cartridges including a spool with convolutions of film of known width wound thereon and comprising a tubular core constructed of a resilient metal and having an imperforate portion and a perforate portion, flanges attached to the ends of the core, the imperforate portion of the core being substantially incompressible and inexpansible by the application of ordinary manual force, the perforate portion of the core consisting of a plurality of narrow interconnecting bands of the resilient core metal forming a resilient area tending to hold the flanges at a predetermined spacing and flexing when the flanges are moved relative to each other.

3. A spool for film cartridges including a spool with convolutions of film of known width wound thereon and comprising a tubular core constructed of a resilient metal and having imperforate ends and a perforate section between the ends, flanges affixed to the imperforate ends and normally held at a predetermined spacing by the core, said perforate portion comprising a plurality of narrow connected bands positioned to provide resilience in the core whereby a film wider than the predetermined spacing of said flanges may be wound therebetween, and said flanges may be resiliently held against said convolutions of film.

4. A spool for film cartridges including a spool with convolutions of film of known width wound thereon and comprising a tubular core constructed of a resilient metal and having an imperforate portion and a perforate portion, flanges attached to the ends of the core, the imperforate portion of the core being substantially incompressible and inexpansible by the application of ordinary manual force, the perforate portion of the core consisting of a plurality of narrow interconnecting bands extending in a general direction transverse to the axis of the core whereby the resilient perforate metal of the core may be flexed while the imperforate metal of the core remains substantially rigid.

5. A spool for film cartridges including a spool with convolutions of film of known width wound thereon and comprising a tubular core constructed of a resilient metal and having an imperforate portion and a perforate portion, flanges attached to the ends of the core, the imperforate portion of the core being substantially incompressible and inexpansible by the application of ordinary manual force, the perforate portion of the core consisting of a plurality of narrow interconnecting bands extending in a general direction transverse to the axis of the core and constituting a lattice pattern in which the said narrow connecting bands are each of much greater length than width transversely of the core facilitating flexure of the core in a direction substantially parallel with the length of the core.

6. A spool for film cartridges including a strip of film of known width, said spool comprising a one-piece core of resilient metal, flanges attached to the core having inwardly turned peripheries on said flanges which lie closer together than other portions of the flanges, means included in the film core adapted to hold convolutions of film between the inwardly turned peripheries of the flanges, said means comprising a flexible portion formed integrally in the core and of a flexibility to permit the withdrawal of film from the convolutions carried by the core through separating the spool flanges due to flexing the film spool core.

JOHN W. SCOTT.
JOSEPH MIHALYI.